MANUFACTURE OF PAPER HAVING IMPROVED WET STRENGTH

Gerald I. Keim, West Grove, Pa., and Alfred C. Schmalz, Wilmington, Del., assignors to Hercules Powder Company, Wilmington, Del., a corporation of Delaware
No Drawing. Filed Sept. 10, 1958, Ser. No. 760,090
4 Claims. (Cl. 162—164)

This invention relates to the manufacture of resin-treated cellulosic fibers and fibrous products prepared therefrom and is directed particularly to a method for improving the wet strength of felted fibers, cellulosic materials, paperboard, shaped paper articles and the like. The invention includes the improved fibrous products themselves as well as methods of preparing these products from aqueous suspensions of fibrous cellulosic materials such as paper pulp.

For many years there were no commercially available wet strength resins which would function effectively at pH's much above about 5.5. As a consequence, many grades of paper made on the alkaline side for various reasons such as strentgh, softness, use of alkaline fillers and so on could not be effectively wet-strengthened.

More recently, high wet-strength paper products have been prepared by the addition thereto of a cationic resin comprising a polymeric reaction product of epichlorohydrin and a polyamide derived from a polyalkylene polyamine and a saturated aliphatic dicarboxylic acid containing from 3–10 carbon atoms. These resins may be used under alkaline conditions, thus making the production of alkaline papers commercially feasible. They may also be used under neutral or acid conditions. Such resins, moreover, are substantive to paper fibers so that they may be economically applied thereto while the fibers are in dilute aqueous suspensions of the consistency used in paper mills.

While the polyamide-epichlorohydrin resins, generally described above, provide greater wet strength in paper than previously available resins, it has been found that still greater increase in wet strength, as well as some increase in dry strength, may be obtained if these resins are used in conjunction with relatively small amounts of certain water-soluble gums. Thus, the use of relatively small amounts of these water-soluble gums substantially enhances the efficiency of these resins in the wet-strengthening paper. Moreover, the improvement in wet strength is greater than would be expected from the combined action of the ingredients, thus indicating that there is a synergistic effect involved when the two are used together.

In carrying out the process of the invention, the cationic resin and the water-soluble gum are added to a dilute aqueous suspension of paper pulp, as in the beater of a paper-making system, following which the pulp is sheeted and dried in the usual manner. The papermaking system (pulp slurry and diluting water) may be acidic, neutral or alkaline. The preferred pH range is from about 5 to 9. Pulp concentrations conventionally used in the papermaking art may be utilized.

The cationic resin and the water-soluble gum are desirably added to the system in the form of dilute aqueous solutions at solids concentrations from about 1 to 10%. The water-soluble gum may be added with the cationic resin or before or after the cationic resin. Some gums, such as carboxymethylcellulose, give better results when they are added before the cationic resin. However, improved results are obtained in either case and the order of addition for attachment of optimum results can be determined readily by one skilled in the art.

The amount of cationic resin to be added will vary with a number of factors such as the particular resin used, the results desired and so on. In most cases, from about 0.1% to about 2% of the resin, based on the dry weight of fiber, will give satisfactory results. However, larger amounts may be used in some cases to obtain special effects, such as an unusually high wet-strength and so on.

The amount of water-soluble gum to be added may likewise be varied. The amount which can be efficiently used in the process for the stated purpose will vary from about 0.05% to about 0.20%, based on the dry weight of pulp, and this, therefore, is the preferred range. Amounts in excess of 0.20% will generally not be necessary but may be used for the obtainment of special effects such as high dry strength, scuff resistance or improved ink hold out.

The cationic thermosetting resins contemplated for use herein may be generally described as water-soluble polymeric reaction products of epichlorohydrin and a polyamide derived from a polyalkylene polyamine and a saturated dicarboxylic acid containing from 3 to 10 carbon atoms.

In the preparation of these products, the dicarboxylic acid is first reacted with the polyalkylene polyamine under conditions such as to produce a water-soluble polyamide containing the recurring groups

—NH($C_nH_{2n}$HN)$_x$—CORCO— where $n$ and $x$ are each 2 or more and R is the divalent hydrocarbon radical of the dicarboxylic acid. This long chain polyamide is then reacted with epichlorohydrin to form the water-soluble cationic thermosetting resins of the invention.

The polyamides utilized in preparing the resins of the present invention are obtained by reacting a saturated aliphatic dicarboxylic acid containing from 3 to 10 carbon atoms, such as malonic, succinic, adipic, azelaic and the like, with a polyalkylene polyamine, preferably in aqueous solution. The saturated dicarboxylic acids having from 4 to 8 carbon atoms in the molecule are preferred. Blends of two or more of the saturated dicarboxylic acids may also be used.

A variety of polyalkylene polyamines including polyethylene polyamines, polypropylene polyamines, polybutylene polyamines and so on may be employed herein, of which the polyethylene polyamines represent an economically preferred class. More specifically, the polyalkylene polyamines of this invention may be represented as polyamines in which the nitrogen atoms are linked together by groups of the formula —$C_nH_{2n}$— where $n$ is a small integer greather than unity and the number of such groups in the molecule ranges from two up to about eight. The nitrogen atoms may be attached to adjacent carbon atoms in the group —$C_nH_{2n}$— or to carbon atoms further apart, but not to the same carbon atom. This invention contemplates not only the use of such polyamines as diethylenetriamine, triethylenetetramine, tetraethylenepentamine, and dipropylenetriamine, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia and ethylenediamine, is a very satisfactory starting material.

The term "polyalkylene polyamine" employed in the claims, therefore, refers to and includes any of the polyalkylene polyamines referred to above or to a mixture of such polyalkylene polyamines.

It is desirable, in some cases, to increase the spacing of secondary amino groups on the polyamide molecule in order to change the reactivity of the polyamide-epichlorohydrin complex. This can be accomplished by substituting a diamine such as ethylenediamine, propylenediamine, hexamethylenediamine and the like for a portion of the polyalkylene polyamine. For this purpose, up to about 80% of the polyalkylene polyamine may be replaced by a molecularly equivalent amount of the diamine. Usually, a replacement of about 50% or less will serve the purpose.

The temperatures employed for carrying out the reaction between the dicarboxylic acid and the polyalkylene polyamine may vary from about 110° C. to about 250° C. or higher at atmospheric pressure. For most purposes, however, temperatures between about 160° C. and 210° C. have been found satisfactory and are preferred. Where reduced pressures are employed somewhat lower temperatures may be utilized. The time of reaction depends on the temperatures and pressures utilized and will ordinarily vary from about ½ to 2 hours, although shorter or longer reaction times may be utilized depending on reaction conditions. In any event, the reaction is desirably continued to substantial completion for best results.

In carrying out the reaction, it is preferred to use an amount of dicarboxylic acid suffiicent to react substantially completely with the primary amine groups of the polyalkylene polyamine but insufficient to react with the secondary amine groups to any substantial extent. This will usually require a mole ratio of polyalkylene polyamine to dicarboxylic acid of from about 0.9:1 to about 1.2:1. However, mole ratios of from about 0.8:1 to about 1.4:1 may be used with quite satisfactory results. Mole ratios outside of these ranges are generally unsatisfactory. Thus, mole ratios below about 0.8:1 result in a gelled product or one having a pronounced tendency to gel while mole ratios above 1.4:1 result in low molecular weight polyamides. Such products do not produce efficient wet-strength resins when reacted with epichlorohydrin.

In converting the polyamide, formed as above described, to a cationic thermosetting resin, it is reacted with epichlorohydrin at a temperature from about 45° C. to about 100° C. and preferably between about 45° C. and 70° C. until the viscosity of a 20% solids solution at 25° C. has reached about C or higher on the Gardner-Holdt scale. This reaction is preferably carried out in aqueous solution to moderate the reaction. pH adjustment is usually not necessary. However, since the pH decreases during the polymerization phase of the reaction it may be desirable, in some cases, to add alkali to combine with at least some of the acid formed.

When the desired viscosity is reached, sufficient water is then added to adjust the solids content of the resin solution to the desired amount, i.e., about 10% more or less, the product cooled to about 25° C. and then stabilized by adding sufficient acid to reduce the pH at least to about 6 and preferably to about 5. Any suitable acid such as hydrochloric, sulfuric, nitric, formic, phosphoric and acetic acid may be used to stabilize the product. However, hydrochloric acid is preferred.

In the polyamide-epichlorohydrin reaction, it is preferred to use sufficient epichlorohydrin to convert all secondary amine groups to tertiary amine groups. However, more or less may be added to moderate or increase reaction rates. In general, satisfactory results may be obtained utilizing from about 0.5 mole to about 1.8 moles of epichlorohydrin for each secondary amine group of the polyamide. It is preferred to utilize from about 1.0 mole to about 1.5 moles for each secondary amine group of the polyamide.

The polyamide-epichlorohydrin resins, prepared as above described, are stable at solids concentrations up to about 10–12%. More recently it has been found that resins of this type which are stable at solids concentrations of 25% and higher may be obtained by (1) adjusting the pH of the resinous polyamine-epichlorohydrin reaction product to about 1.8 to 2.0 with an inorganic or organic acid and/or (2) by including a quaternizing agent in the formulation. When pH adjustment is used the reaction of the polyamide with the epichlorohydrin is carried out as above described until the desired viscosity is reached. If necessary, water is then added or removed to adjust the solids content of the resin solution to the desired level, the product cooled to about 25° C. and then stabilized by adding sufficient acid to reduce the pH to about 1.8 to 3.0. Any suitable acid such as hydrochloric, sulfuric, nitric, formic, phosphoric, acetic or the like may be used.

When a quaternizing agent is included in the formulation the preferred procedure is as follows: The epichlorohydrin is first added to an aqueous solution of the polyamide at a temperature from about 45° to 55° C. The reaction mixture is then heated at a temperature from about 50° to 100° C. and preferably from about 60° to 80° C. depending upon the rate of polymerization desired. After a suitable time at this temperature, i.e., from about 0–100 minutes, and preferably until the viscosity of an approximately 25% solids solution of the reaction mixture at 25° C. is from about <A to <B on the Gardner-Holdt scale, at which time most of the epoxy groups of the epichlorohydrin have reacted with the secondary amine groups of the polyamide, the quaternizing agent is added and the reaction mixture heated, preferably at a temperature from about 60° C. to about 80°., until the viscosity of an approximately 25% solids solution at 25° C. is at least A and preferably at least B to C on the Gardner-Holdt scale. The solids-viscosity relationship may be obtained by (1) direct polymerization at the 25% level, (2) polymerization at a higher level followed by dilution to 25% solids, or (3) polymerization at a lower level followed by concentration at less than 40° C. and under reduced pressure to 25% solids. The pH of the reaction mixture is then reduced to about 4.0 and preferably to about 1.8 to 3.0 with any suitable acid such as sulfuric, hydrochloric, formic and the like. The initial degree of polymerization, quantity of quaternizing agent and final pH are all important in controlling the stability of the resins.

The quaternizing agent may be any compound capable of quaternizing a tertiary nitrogen atom in an aqueous medium. In general, these compounds are characterized by having as a principal part of their structure an alkyl group or substituted alkyl group which is readily available for alkylation under the conditions herein described. These include the lower alkyl esters of mineral acids such as the halides, sulfates and phosphates, substituted alkyl halides and so on. Illustrative of the compounds which may be used are dimethyl, diethyl and dipropyl sulfate, methyl chloride, methyl iodide, ethyl iodide, methyl bromide, propyl bromide, the mono-, di- or tri-methyl, ethyl and propyl phosphates, 1,3-dichloropropanol-2, 1-chloroglycerol and so on. Certain aromatic compounds such as benzyl chloride and methyl p-toluene sulfonate may also be used.

The amount of alkylating agent used may be varied depending upon the stability desired and other factors. In general, sufficient should be used to convert from about 25% to about 75% of the tertiary amine groups to quaternary groups. This will require from about 0.25 mole to about 0.75 mole of the alkylating agent for each tertiary amine group. It is preferred to utilize about 0.5 mole of alkylating agent for each tertiary amine group.

The water-soluble gums suitable for use herein include water-soluble cellulose ethers such as carboxymethylcellulose, carboxymethyl hydroxyethyl cellulose and so on. Cationic-modified starches, i.e., starches which have been modified by partial substitution of the hydroxyl groups of the starch molecule with amino nitrogen, as disclosed, for example in U.S. 2,813,093, may also be used.

The following examples will illustrate the invention.

EXAMPLES 1–8

Into a 1-liter, 3-necked round bottom flask fitted with mechanical stirrer, thermometer and distilling condenser was placed 200 g. (1.94 moles) of diethylenetriamine and 100 g. of water. The flask was flushed with nitrogen and kept under a nitrogen blanket throughout the reaction. To the well-stirred mixture was added, in six approximately equal portions, 290 g. (2.00 moles) of adipic acid. After the acid had dissolved in the amine, the solution was heated to $190\pm5°$ C. and held there for 1.5 hours. The reaction mixture was then cooled to 140° C. and diluted with 430.0 g. of water. The polyamide solution contained 54.6% solids and had an intrinsic viscosity (2% solution in 1 N ammonium chloride) of 0.116.

To 116 g. (63 g. dry basis) of this polyamide solution in a round bottom flask equipped with mechanical stirrer and thermometer was added 210 g. of water. The solution was heated with stirring to 50° C. and 25.0 g. of epichlorohydrin was added during a period of 2 minutes. The solution was heated to 70° C. and, after 10 minutes at this temperature, 17.0 g. of dimethyl sulfate was added dropwise over a period of 7 minutes. The solution was heated with stirring at 70° C. until a Gardner viscosity of <C was attained (4 hours, 16 minutes). It was then cooled to 25° C. and adjusted to pH 4.0 with 3.1 ml. of 10% sulfuric acid. The product contained 27.0% solids and had a Gardner viscosity of >B at 25° C. (Brookfield viscosity 51.2 cps. at 25° C.). The product was stable to storage at $25\pm2°$ C. for at least 75 days. It was evaluated in paper as follows:

A sample of Tacoma bleached kraft pulp was beaten to a Schopper-Riegler freeness of 750 cc. at a consistency of 2.5%. To 50 g., dry basis, of this pulp was added 0.05 g. of CMC CT low (a crude technical grade of Hercules CMC [cellulose gum] containing 80% active ingredient and having 0.7 carboxyl groups per glucose molecule) dissolved in 50 ml. of water. The slurry was stirred for 5 minutes and then was diluted to 17 liters in a Noble and Wood proportioner. To this was added 25 g. of a 1% solution of the resin, prepared as above described (0.5% based on the dry weight of pulp). This pulp was then formed into 8 x 8 inch square handsheets on a Noble and Wood handsheet machine at a basis weight of 40 lb./ream. The handsheets were dried on a rotary drum drier to a moisture content of 5%. Half of these sheets were given an additional cure of one hour at 105° C. Part of the cured and uncured handsheets were soaked in distilled water for two hours and then tested for wet tensile strength using an Amthor tensile tester. Dry tensiles were determined on sheets which had been stored at 72° F. and 50% relative humidity for 24 hours.

Other experiments were run as above in which the CMC content was varied from 0–0.2% and the resin from 0.5–2.0%. Results are given in Table I.

Table I

| Example No. | Percent Resin Added Based on Weight of Dry Pulp | Percent CMC CT Low Added Based on Dry Weight of Pulp | Wet Tensile, lb./in. | Wet Tensile of Paper Cured 1 hr. at 105° C., lb./in. | Dry Tensile, lb./in. | Dry Tensile of Paper Cured 1 hr. at 105° C., lb./in. |
|---|---|---|---|---|---|---|
| 1 | 0.5 | 0 | 4.8 | 7.5 | 30 | 32 |
| 2 | 0.5 | 0.1 | 5.4 | 7.9 | 30 | 32 |
| 3 | 0.5 | 0.2 | 5.8 | 8.4 | 33 | 34 |
| 4 | 1.0 | 0 | 6.6 | 10.4 | 32 | 35 |
| 5 | 1.0 | 0.1 | 7.3 | 10.6 | 30 | 35 |
| 6 | 2.0 | 0 | 7.8 | 12.6 | 32 | 35 |
| 7 | 2.0 | 0.1 | 8.5 | 13.4 | 33 | 35 |
| 8 | 2.0 | 0.2 | 9.1 | 13.5 | 34 | 36 |

EXAMPLES 9–14

The procedure used in Example 1 to prepare wet-strength handsheets was repeated except that a cationic starch prepared by reacting diethylaminoethyl chloride with starch in an alkaline solution and having 0.3% $N_2$ and a D.S. of 0.03, was used in place of the CMC CT low. Results are listed in Table II.

Table II

| Example No. | Percent Resin Added Based on Dry Weight of Pulp | Percent Cationic Starch Based on Dry Weight of Pulp | Wet Tensile, lb./in. | Wet Tensile, Cured 1 hr. at 105° C., lb./in. | Dry Tensile, lb./in. | Dry Tensile, Cured 1 hr. at 105° C., lb./in. |
|---|---|---|---|---|---|---|
| 9 | 0.5 | 0 | 4.8 | 8.5 | 29 | 31 |
| 10 | 0.5 | 0.2 | 5.1 | 9.3 | 32 | 34 |
| 11 | 1.0 | 0 | 5.8 | 10.6 | 30 | 33 |
| 12 | 1.0 | 0.2 | 6.1 | 11.3 | 32 | 35 |
| 13 | 2.0 | 0 | 6.7 | 12.8 | 30 | 34 |
| 14 | 2.0 | 0.2 | 7.0 | 13.2 | 33 | 35 |

EXAMPLES 15–23

The procedure outlined in Example 1 for the preparation of wet-strength handsheets was modified as follows: Bleached kraft pulp was prepared as in Example 1. To the thick stock was added from 0.5 to 1.5% of the resin, prepared as in Example 1. To the dilute stock in the proportioner was added 0–0.2% CMC CT low. The results are listed in Table II.

Table III

| Example No. | Percent Resin Added Based on Weight of Dry Pulp | Percent CMC CT Low Added Based on Dry Weight of Pulp | Wet Tensile, lb./in. | Wet Tensile After Curing 1 hr. at 105° C., lb./in. | Dry Tensile, lb./in. | Dry Tensile After Additional Cure at 105° C., lb./in. |
|---|---|---|---|---|---|---|
| 15 | 0.5 | 0 | 4.9 | 8.0 | 31 | 32 |
| 16 | 0.5 | 0.1 | 5.7 | 8.5 | 32 | 33 |
| 17 | 0.5 | 0.2 | 6.3 | 8.8 | 33 | 34 |
| 18 | 1.0 | 0 | 6.6 | 11.2 | 33 | 33 |
| 19 | 1.0 | 0.1 | 7.3 | 11.1 | 32 | 33 |
| 20 | 1.0 | 0.2 | 7.7 | 11.0 | 33 | 34 |
| 21 | 1.5 | 0 | 7.9 | 12.8 | 32 | 34 |
| 22 | 1.5 | 0.1 | 8.6 | 13.2 | 35 | 35 |
| 23 | 1.5 | 0.2 | 8.7 | 13.0 | 34 | 35 |

The following comparative examples show that an unexpected increase in wet strength is obtained when CMC-CT low is used in conjunction with the polyamide-epichlorohydrin resins herein disclosed for the wet strengthening of paper.

EXAMPLES 24–27

Into a three-necked flask fitted with mechanical stirrer, thermometer and condenser was placed 200 g. (1.94 moles) of diethylenetriamine and 100 g. of water. The flask was flushed with nitrogen and kept under a nitrogen blanket throughout the reaction. To the well-stirred mixture was added, in six approximately equal portions, 290 g. (2.00 moles) of adipic acid. After the acid had dissolved in the amine, the solution was heated to $190\pm5°$ C. and held there for 90 minutes. The reaction mixture was then cooled to 140° C. and diluted with 430.0 g. of water. The polyamide solution contained 54.6% solids and had an intrinsic viscosity (2% solution in 1 N ammonium chloride) of 0.116.

To 60 g. of this polyamide solution was added 225 g. of water. This solution was heated to 50° C. and 15.5 g. of epichlorohydrin was added dropwise. The solution was then heated to 60–70° C. until it had attained a Gardner viscosity of about D. Then 150 g. of water was added, the product cooled to 25° C. and the pH adjusted to 5.0 with sulfuric acid. The product contained 9.0% solids and had a Brookfield viscosity of 45 centipoises.

Tacoma bleached kraft pulp was beaten to a Schopper-Riegler freeness of 750 cc. at a consistency of 2.5%. Using this pulp, four sets of handsheets were made on the Noble and Wood Laboratory Handsheet Machine. One set of handsheets was prepared from the above pulp at pH 7.5; a second set was prepared at pH 7.5 from pulp to which 0.5% of the above described resin (resin solids based on bone dry weight of pulp) had been added; a third set was prepared in an identical manner except that 0.2% CMC–CT low was substituted for the resin; a fourth set was prepared in which both 0.5% resin and 0.2% CMC–CT low were added to the pulp. The handsheets were dried on a laboratory drum drier to 5% moisture content. Portions of each set of handsheets were given an additional cure for one hour at 105° C. The handsheets were tested for wet tensile and dry tensile strength. Results are given in Table IV:

*Table IV*

| Example No. | Percent Resin | Percent CMC-CT Low | Wet Tensile | Cured Wet Tensile | Dry Tensile | Cured Dry Tensile |
|---|---|---|---|---|---|---|
| 24 | 0 | 0 | 1.0 | 1.2 | 29 | |
| 25 | 0.5 | 0 | 5.3 | 8.9 | 31 | 32 |
| 26 | 0 | 0.2 | 1.2 | 1.4 | 29 | 29 |
| 27 | 0.5 | 0.2 | 6.2 | 9.8 | 32 | 33 |

It will thus be seen that the present invention provides a process for improving the wet strength of paper obtainable by use of cationic polyamide-epichlorohydrin resins of the type herein disclosed. While specific embodiments of the invention have been illustrated and described herein, it will be understood that changes and variations may be made without departing from the scope of the invention as defined in the claims which follow.

What we claim and desire to protect by Letters Patent is:

1. A process for the production of paper having improved wet strength which comprises incorporating therein a cationic resin and a water-soluble gum selected from the group consisting of (1) water-soluble cellulose ethers and (2) cationic starches, said resin comprising a water-soluble reaction product of epichlorohydrin and a polyamide obtained by heating together a $C_3$–$C_{10}$ saturated aliphatic dicarboxylic acid and from about 0.8 to about 1.4 moles, per mole of dicarboxylic acid, of a polyalkylene polyamine, said polyamide containing secondary amine groups, the ratio of epichlorohydrin to secondary amine groups of said polyamide being from about 0.5:1 to about 1.8:1.

2. A process for the production of paper having improved wet strength which comprises adding to an aqueous suspension of cellulosic paper stock a cationic resin and a water-soluble gum selected from the group consisting of (1) water-soluble cellulose ethers and (2) cationic starches, said resin comprising a water-soluble reaction product of epichlorohydrin and a polyamide obtained by heating together a $C_3$–$C_{10}$ saturated aliphatic dicarboxylic acid and from about 0.8 to about 1.4 moles, per mole of dicarboxylic acid, of a polyalkylene polyamine, said polyamide containing secondary amine groups, the ratio of epichlorohydrin to secondary amine groups of said polyamide being from about 0.5:1 to about 1.8:1, forming the stock so treated into a sheet, and drying the sheet.

3. A process as set forth in claim 2 wherein the water-soluble gum is carboxymethylcellulose.

4. A process as set forth in claim 2 wherein the water-soluble gum is a starch modified by partial substitution of the hydroxyl groups of the starch molecule with amino nitrogen.

References Cited in the file of this patent

UNITED STATES PATENTS

| | | |
|---|---|---|
| 2,215,136 | Shur | Sept. 17, 1940 |
| 2,601,597 | Daniel et al. | June 24, 1952 |
| 2,685,508 | Spear | Aug. 3, 1954 |
| 2,694,629 | Reynolds | Nov. 16, 1954 |
| 2,698,793 | Landes | Jan. 4, 1955 |
| 2,765,228 | Jordan | Oct. 2, 1956 |
| 2,786,759 | Feigley | Mar. 26, 1957 |
| 2,926,116 | Keim | Feb. 23, 1960 |
| 2,935,436 | Caldwell | May 3, 1960 |

FOREIGN PATENTS

| | | |
|---|---|---|
| 711,404 | Great Britain | June 30, 1954 |
| 559,948 | Canada | July 8, 1958 |

UNITED STATES PATENT OFFICE
CERTIFICATE OF CORRECTION

Patent No. 3,058,873                      October 16, 1962

Gerald I. Keim et al.

It is hereby certified that error appears in the above numbered patent requiring correction and that the said Letters Patent should read as corrected below.

Column 1, line 68, for "attachment" read -- attainment --; column 3, line 71, for "polyamine-" read -- polyamide- --; column 6, line 22, for "Table II" read -- Table III --.

Signed and sealed this 26th day of March 1963.

(SEAL)
Attest:

ESTON G. JOHNSON

Attesting Officer

DAVID L. LADD
Commissioner of Patents